(12) United States Patent
Phillips

(10) Patent No.: US 12,432,401 B2
(45) Date of Patent: Sep. 30, 2025

(54) SYSTEMS AND METHODS FOR INSERTING SUPPLEMENTAL CONTENT INTO CLOUD-RENDERED MEDIA CONTENT

(71) Applicant: Adeia Guides Inc., San Jose, CA (US)

(72) Inventor: Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/761,597

(22) Filed: Jul. 2, 2024

(65) Prior Publication Data
US 2025/0039475 A1 Jan. 30, 2025

Related U.S. Application Data

(63) Continuation of application No. 17/745,397, filed on May 16, 2022, now Pat. No. 12,058,390.

(51) Int. Cl.
| | |
|---|---|
| H04N 21/234 | (2011.01) |
| H04N 21/44 | (2011.01) |
| H04N 21/478 | (2011.01) |
| H04N 21/81 | (2011.01) |

(52) U.S. Cl.
CPC . *H04N 21/23424* (2013.01); *H04N 21/44016* (2013.01); *H04N 21/4781* (2013.01); *H04N 21/812* (2013.01)

(58) Field of Classification Search
CPC ................................................. H04N 21/23424
See application file for complete search history.

(56) References Cited

U.S. PATENT DOCUMENTS

| | | |
|---|---|---|
| 12,058,390 B2 | 8/2024 | Phillips |
| 2009/0300145 A1 | 12/2009 | Musayev et al. |
| 2020/0108316 A1 | 4/2020 | Nay |
| 2023/0080406 A1* | 3/2023 | Connelly, Jr. ........... A63F 13/65 463/31 |
| 2023/0370655 A1 | 11/2023 | Phillips |

FOREIGN PATENT DOCUMENTS

| | | |
|---|---|---|
| CN | 111582924 A | 8/2020 |
| CN | 114404961 A | 4/2022 |

\* cited by examiner

*Primary Examiner* — Michael H Hong
(74) *Attorney, Agent, or Firm* — HALEY GUILIANO LLP

(57) ABSTRACT

Systems and methods are disclosed herein for inserting supplemental content into cloud-rendered media content, such as video game cutscenes. The media content is rendered and encoded for streaming to a client device. Data related to a current session associated with the client device is retrieved. Based on the retrieved session data, a supplemental content item is identified for insertion into the streaming media content. If an insertion point is detected within the streaming media content, the supplemental content item is streamed to the client device in place of the streaming media content. Once streaming of the supplemental content item has ended, either at the end of the supplemental content item or in response to a request from the client device to skip the supplemental content item, streaming of the streaming media content is resumed.

20 Claims, 6 Drawing Sheets

SYSTEMS AND METHODS FOR INSERTING SUPPLEMENTAL CONTENT INTO CLOUD-RENDERED MEDIA CONTENT

CROSS-REFERENCE TO RELATED APPLICATION

This application is a continuation of U.S. patent application Ser. No. 17/745,397, filed May 16, 2022, the disclosure of which is hereby incorporated by reference herein in its entirety.

BACKGROUND

This disclosure is directed to cloud-rendered streaming media content. In particular, techniques are disclosed for insertion of supplemental content into cloud-rendered streaming media content.

SUMMARY

Online purchases of games with the ability to download, install, and run the games locally has been around for a long time. Now companies are starting to offer services for users to subscribe and play games that run in the network. This is called cloud gaming. Cloud gaming uses a technique called remote rendering.

Cloud gaming is gaining traction with game studios, internet companies and network operators. There are currently products on the market, like Google's Stadia™, Nvidia's GeForce Now™, and Sony's PS Now™, that offer remote game streaming as a business. Amazon and other companies are also entering into the business of cloud gaming. Remote rendered games run somewhere in the network, typically at a network edge location that encodes the video, audio and haptics output of the rendered game. The encoded video is transported/streamed over the network using a low latency protocol such as RTP to the client device. The client device decodes the video, audio and haptics data streams and renders those to display/output the game on a client device. The controller input is consumed on the local device and delivered over the network to the remotely running game engine. In remote rendered/cloud gaming, the game engine is running at the edge and rendering the video output.

Cutscenes are included by game studios and provide a video cinematic experience to enhance the game experience and to mask long load times when transitioning from one main game play level/world to the next. Game level load times can be as much as 30-50 seconds when transitioning from one level to the next. Rather than show a busy cursor (e.g., an animated icon), game engines offer the ability to render a cutscene, which ties to the game play and involves computer animated in-game characters acting out scenes that tell a story for the upcoming level. These cutscenes can be up to 5-10 minutes. The game engine will allow for bypassing the cutscene once the next game level has been loaded, allowing the user to continue immediately after the required loading time has elapsed.

Many newer game cutscenes are now interactive and are customized to the in-game purchases and upgrades. When games are running locally and the cutscenes are generated from the same game engine, this is basically an extension of the game, and it is straightforward to offer basic interactivity and generate a custom cutscene based on the customization of the player's character. In cloud gaming, it is important to be able to offer the same experience without consuming managed network resources and bandwidth required to run the game in its main gaming mode.

Today, for most games, video-based supplemental content, such as advertisements, is not played in a game engine. These supplemental content items are not played when the game is running locally on a PC or game console, nor are they played when remotely rendered in the cloud. In general, supplemental content exists in locally run mobile games. However, it mostly takes the form of pop-up content overlaid on parts of the game and is not traditional video-based supplemental content. In the mobile game world, this is beginning to change. For example, Unity has recently provided a way for video ads to be played in a game. In this case, however, the game is running locally on a mobile device.

In addition to the supplemental content, there is basic demographic information to target the user with supplemental content within a game. These types of supplemental content are usually advertisements and focus on advertising some app in an app store like Google Play or Apple App Store. Typically, these are advertisements for other games from the same game studio or the game studio's partners. The game studios also advertise for game or character upgrades, which must be purchased using real currency rather than in-game rewards, which are earned by completing game levels or collecting items in the game. This leads to very limited in-game advertising, especially for video-based ads.

Systems and methods are disclosed herein for inserting supplemental content into cloud-rendered media content, such as video game cutscenes. The media content is rendered and encoded for streaming to a client device. Data related to a current session associated with the client device is retrieved. Based on the retrieved session data, a supplemental content item is identified for insertion into the streaming media content. For example, game data may be retrieved for the current game session and used to determine which of a plurality of available supplemental content items would be best suited for a user of the client device. If an insertion point is detected within the streaming media content, the supplemental content item is streamed to the client device in place of the streaming media content. Once streaming of the supplemental content item has ended, either at the end of the supplemental content item or in response to a request from the client device to skip the supplemental content item, streaming of the streaming media content is resumed.

The streaming media content and the supplemental content may initially be received as raw multimedia data, which is then input into a streaming media encoder. The raw multimedia data of the streaming media content may be encoded into a streaming media format and streamed to the client device. When an insertion point is detected during the encoding process, input of the raw multimedia data of the streaming media content is paused and raw multimedia data of the supplemental content item is inputted into the streaming media encoder in its place. When it is time to resume streaming of the streaming media content, input of the raw multimedia data of the supplemental content to the encoder is stopped and input of the raw multimedia data of the streaming media content is resumed.

To identify a supplemental content for insertion into the streaming media content, a parameter related to the streaming media content may be retrieved and compared with a reference value. For example, if the streaming media content is a video game cutscene, a parameter is retrieved from game data and its value compared to a reference value. A supplemental content item can be selected based on the comparison of the two values. In some cases, the parameter describes a network condition. For example, it may describe an amount of bandwidth available to the client device or a maximum transmission rate (e.g., 30 Mbps) of the connection through with the client device communicates with the cloud-based media server. In these cases, the reference value may describe a threshold level for the relevant network condition at which a user of the client device will experience better media content performance. If the value of the parameter does not meet or exceed the reference value, a supplemental content item related to the relevant network condition may be identified for insertion. For example, if the parameter describes the maximum transmission rate, with a value of 30 Mbps, and the reference value is 50 Mbps, an advertisement for an internet service provider offering connection speeds in excess of 50 Mbps may be identified for insertion into the video game cutscene.

In some cases, in which the streaming media content is a video game cutscene, the parameter describes an in-game condition. For example, it may describe a characteristic or ability level of the user's in-game character. In these cases, the reference value may describe a first ability level. If the value of the parameter meets or exceeds the reference value, a supplemental content item related to a second ability level higher than the first ability level may be identified for insertion into the video game cutscene. For example, an in-game offer to increase the in-game character's total health, strength, agility, or other characteristic may be identified. If the value of the parameter does not meet or exceed the reference value, a supplemental content item related to the first ability level may be identified for insertion. For example, an in-game offer to increase the in-game character's statistics to reach the first ability level may be identified for insertion.

The video game cutscene may be an interactive cutscene, with two or more paths the user can choose at one or more interaction points. A supplemental content item may therefore be identified for insertions into the video game cutscene by first identifying a plurality of interactivity paths in the interactive cutscene. Based on the game data, it may be determined whether a first interactivity path has been selected. If so, a supplemental content item related to the first interactivity path is identified for insertion.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
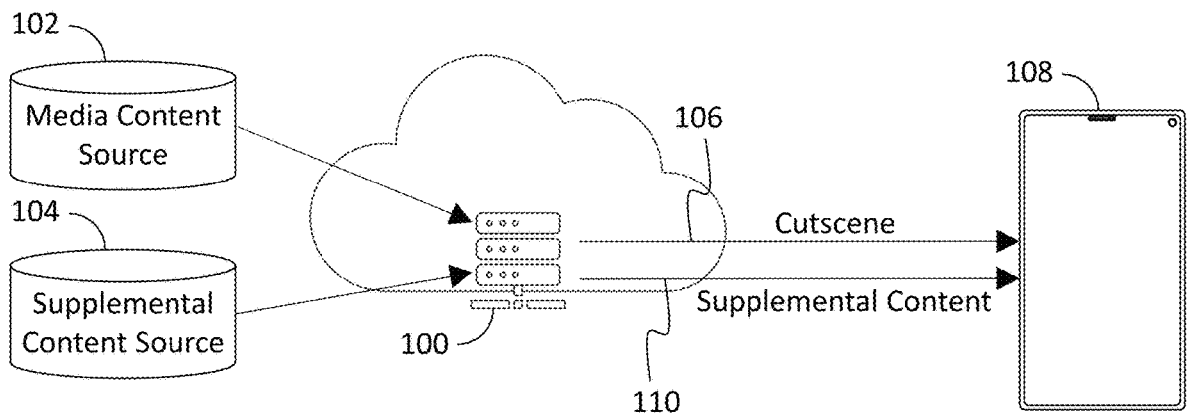
FIG. 1 is a diagram showing delivery of streaming media content and supplemental content to a client device, in accordance with some embodiments of the disclosure.

FIG. 1 is a diagram showing delivery of streaming media content and supplemental content to a client device, in accordance with some embodiments of the disclosure. A cloud-based media server 100 is responsible for ingesting and encoding media content for delivery to client devices. Media server 100 receives media content from media content source 102 and supplemental content from supplemental content source 104. Media server 100 encodes the media content and supplemental content in a streaming format. Media server 100 then delivers 106 the media content to client device 108. When supplemental content is to be inserted into the presentation of the media content, media server 100 delivers 110 the supplemental content to client device 108. In some cases, media server 100 may use separate streams, and even separate encoders, to encode and deliver the media content and supplemental content separately. In other cases, however, the media content and supplemental content are encoded by a single encoder into a single output stream. Thus, the ingestion of supplemental content by the encoder may occur on demand when a supplemental content insertion point is detected in the media content by the encoder.

Figure 2:
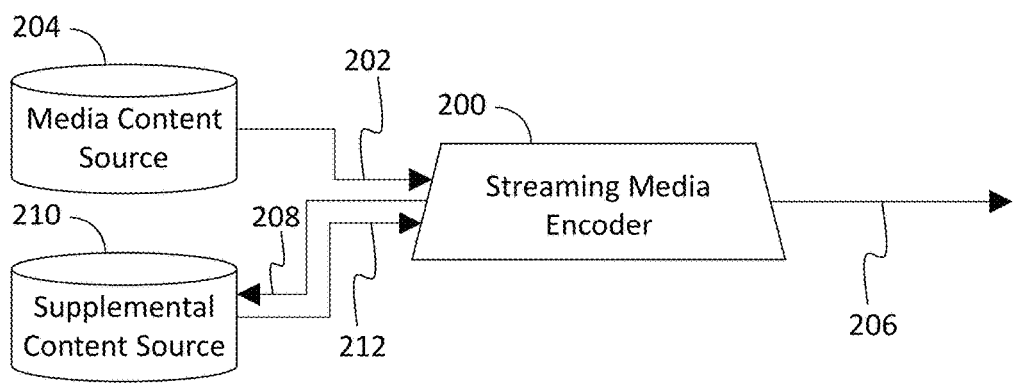
FIG. 2 is a diagram showing encoding of streaming media content and supplemental content into a single output stream, in accordance with some embodiments of the disclosure.

FIG. 2 is a diagram showing encoding of streaming media content and supplemental content into a single output stream, in accordance with some embodiments of the disclosure. Streaming media encoder 200 receives 202 raw media data for the media content from media content source 204. Streaming media encoder encodes the raw media data in a format suitable for streaming, such as H.264, and streams 206 the encoded media content to a client device. When supplemental content is to be inserted, streaming media encoder 200 requests 208 a supplemental content item from supplemental content source 210. Streaming media encoder 200 receives 212 raw media data of the requested supplemental content item and encodes it into the streaming format as part of the same output stream as the media content. Thus, the output stream sent 206 to the client device contains the media content and supplemental content in a linear manner.

Figure 3:
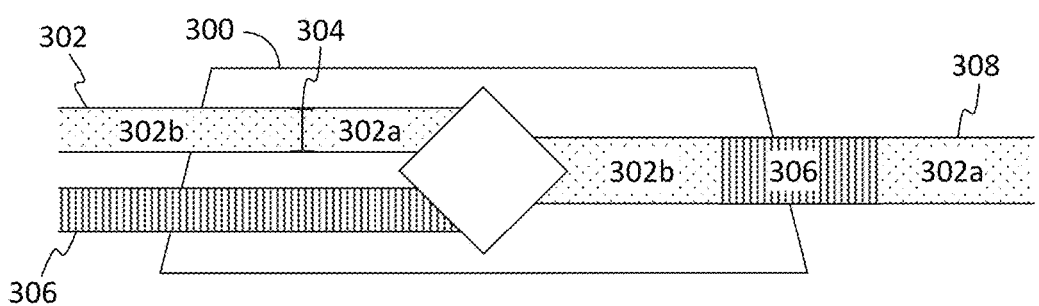
FIG. 3 is a diagram showing insertion, at an encoder, of supplemental content into streaming media content at an insertion point to generate a single output stream, in accordance with some embodiments of the disclosure.

FIG. 3 is a diagram showing insertion, at an encoder, of supplemental content into streaming media content at an insertion point to generate a single output stream, in accordance with some embodiments of the disclosure. Encoder 300, such as streaming media encoder 200, receives a raw media stream 302 for the media content. The media content includes an insertion point 304. Encoder 300 encodes a first portion of the media content 302a in a streaming format. When encoder 300 reaches insertion point 304, encoder 300 accesses supplemental content 306. Encoder 300 encodes supplemental content 306 in the streaming format. When complete, encoder 300 resumes encoding the next portion of media content 302b. The resulting stream 308 is therefore composed of portion 302a, followed by supplemental content 306 and portion 302b in a single stream.

Figure 4:
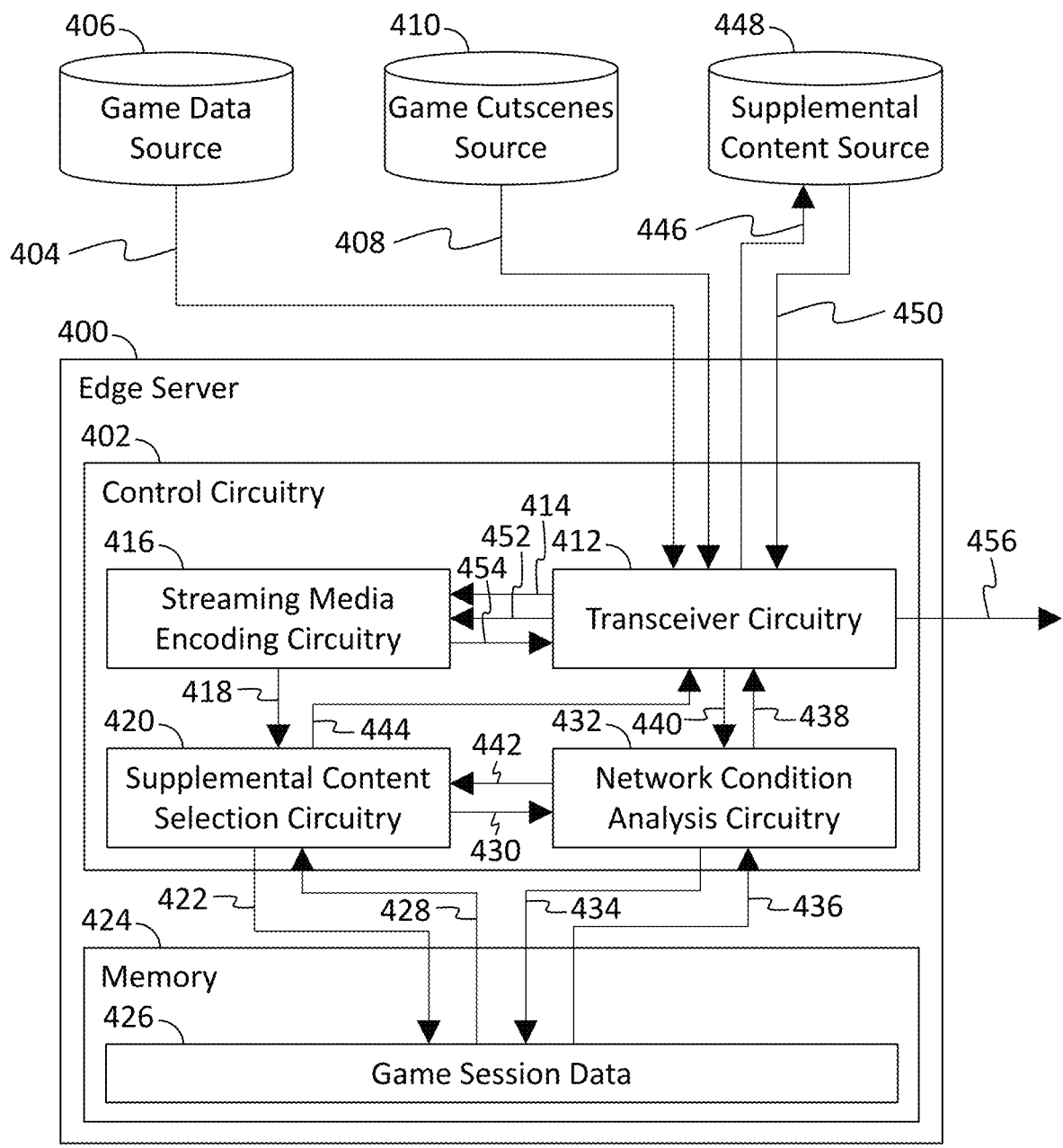
FIG. 4 is a block diagram showing components and data flow therebetween of a system for inserting supplemental content into cloud-rendered streaming media content, in accordance with some embodiments of the disclosure.

FIG. 4 is a block diagram showing components and data flow therebetween of a system for inserting supplemental content into cloud-rendered streaming media content, in accordance with some embodiments of the disclosure. While the system described in FIG. 4 relates to video game cutscenes, it will be appreciated by those skilled in the art that the actions described below may be applied to any type of media into which supplemental content items may be inserted.

Edge server 400 may be the network node in a cloud computing environment, such as a mobile broadband network, that is responsible for encoding and delivering media content to a client device. Edge server 400 includes control circuitry 402. Control circuitry 402 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 402 may receive 404 raw media data for a video game cutscene from game data source 406 or receive 408 the raw video data for the video game cutscene from a dedicated game cutscenes source 410. The video game cutscene is received using transceiver circuitry 412. Transceiver circuitry 412 comprises a network connection over which data can be transmitted to and received from remote devices, such as an ethernet connection, Wi-Fi connection, mobile broadband interface, or connection employing any other suitable networking protocol. Transceiver circuitry 412 in turn transmits 414 the received raw media data to streaming media encoding circuitry 416. Streaming media encoding circuitry 416 encodes the raw media data into a multimedia format suitable for streaming and packages the converted multimedia data using a streaming protocol such as MPEG-DASH.

While encoding the raw media data of the video game cutscene, streaming media encoding circuitry 416 monitors the media data for a supplemental content insertion point. For example, the raw media data may include metadata in one or more frames indicating at which frame supplemental content should be inserted. When detected, streaming media encoding circuitry 416 transmits 418 a request for supplemental content to supplemental content selection circuitry 420. In some cases, supplemental content selection circuitry may simply select a paid advertisement or other scheduled or paid supplemental content for insertion into the video game cutscene. In other cases, however, supplemental content selection circuitry 420 may select a supplemental content item based on in-game conditions or network conditions experienced by a client device.

If the supplemental content item is to be selected based on an in-game condition, supplemental content selection circuitry 420 transmits 422 a request to memory 424 to retrieve, from game session data 426, a parameter of the current game session that relates to an in-game condition. For example, the parameter may relate to a current ability level, experience level, health level, strength, agility, or other characteristic of a user's in-game character. Supplemental content selection circuitry 420 receives 428 the parameter and compares the value of the parameter to a reference value. For example, the parameter may relate to a current ability level in a game in which increases in one's ability level occur upon accumulation of set numbers of points. Supplemental content selection circuitry 420 compares a value of the parameter, which may be a number of accumulated points, to a reference value, which may be the number of points needed to reach a specific ability level. If the value of the parameter does not meet or exceed the reference value, supplemental content selection circuitry 420 may determine that supplemental content that offers the user additional points should be selected. If the value of the parameter meets or exceeds the reference value, supplemental content relating to other in-game offers may be selected.

If the supplemental content item is to be selected based on a network condition, supplemental content selection circuitry 420 transmits 430 a request to network condition analysis circuitry 432 for network condition information. Game session data 426 may include network information data reported by the client device. Network condition analysis circuitry 432 may transmit 434 a request to memory 424 to retrieve network information data from game session data 426. Network information data reported by the client device may include the type of network over which the client device is connected to edge server 400, a maximum transmission rate observed by the client device, or other information related to the connection between the client device and edge server 400. Network condition analysis circuitry 432 receives 436 the request network information data from game session data 426. Network condition analysis circuitry 432 may, alternatively or additionally, conduct tests on the connection between the client device and edge server 400. Network condition analysis circuitry 432 may transmit 438, via transceiver circuitry 412, a test packet, or "ping" to the client device. Network condition analysis circuitry 432 may record the time the test packet was transmitted and a time at which an acknowledgement (ACK) message is received 440 from the client device. From these two times and the size of the test packet, network condition analysis circuitry 432 determines the transmission rate of the connection between edge server 400 and the client device.

Once the network conditions have been determined, network condition analysis circuitry 432 transmits 442 a parameter related to the network conditions to supplemental content selection circuitry 420. Supplemental content selection circuitry 420 compares the value of the parameter to a reference value. For example, the parameter may describe the maximum transmission speed of the connection between edge server 400 and the client device. The reference value may be a minimum transmission speed required so as not experience lag during gameplay. If the value of the parameter does not meet or exceed the reference value, supplemental content selection circuitry may determine that supplemental content related to increased network transmission speeds should be selected.

Once the supplemental content to be inserted has been identified, supplemental content selection circuitry 420 transmits 444 a request for the identified supplemental content to transceiver circuitry 412, which in turn transmits 446 the request to supplemental content source 448. In response, supplemental content source 448 transmits 450 raw media data of a supplemental content item matching the request to edge server 400. The raw media data of the supplemental content item is received using transceiver circuitry 412, which transmits 452 the raw media data to streaming media encoding circuitry 416.

Streaming media encoding circuitry 416 pauses ingestion of raw media data of the video game cutscene and instead ingests the raw media data of the supplemental content. Upon completion of the supplemental content, or in response to an input from the client device to skip a portion of the supplemental content, streaming media encoding circuitry 416 resumes ingestion of the raw media data of the video game cutscene. Streaming media encoding circuitry 416 continuously outputs 454 the encoded media data as a single media stream. Transceiver circuitry 412 transmits 456 the media stream to the client device.

Figure 5:
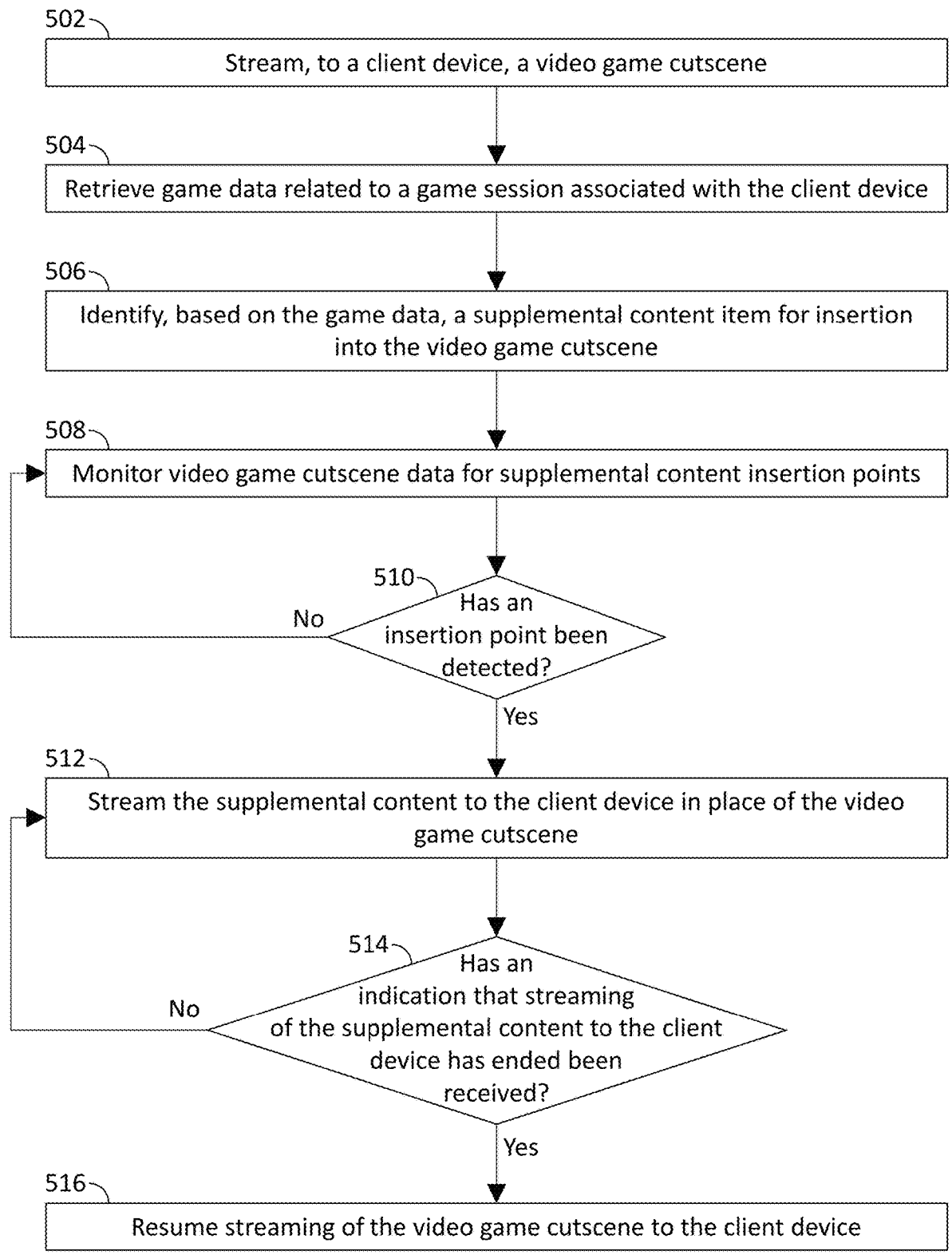
FIG. 5 is a flowchart representing a process for inserting supplemental content into a cloud-rendered video game cutscene, in accordance with some embodiments of the disclosure.

FIG. 5 is a flowchart representing an illustrative process 500 for inserting supplemental content into a cloud-rendered video game cutscene. Process 500 may be implemented on control circuitry 402. In addition, one or more actions of process 500 may be incorporated into or combined with one or more actions of any other process or embodiment described herein.

At 502, control circuitry 402 streams, to a client device, a video game cutscene. Control circuitry 402 encodes raw media data of the video game cutscene into a streaming media format for streaming to the client device. At 504, control circuitry 402 retrieves game data related to a game session associated with the client device. A unique session ID may be associated with the client device. Control circuitry 402 may use the session ID to retrieve the game session data for that session. At 506, control circuitry 402 identifies, based on the game data, a supplemental content item for insertion into the video game cutscene. Methods for accomplishing this are described below in connection with FIG. 7.

At 508, control circuitry 402 monitors video game cutscene data for supplemental content insertion points. For example, the video game cutscene data may include flags or other metadata indication where an insertion point occurs. At 510, control circuitry 402 determines whether an insertion point has been detected. If not ("No" at 510), then control circuitry 402 continues, at 508, to monitor the video game cutscene data.

If an insertion point has been detected ("Yes" at 510), then, at 512, control circuitry 402 streams the supplemental content to the client device in place of the video game cutscene. This may be accomplished by pausing streaming of the video game cutscene and initiating a second stream containing the supplemental content. This may also be accomplished using methods described below in connection with FIG. 6, in which control circuitry 402 generates a single media stream from both the video game cutscene and the supplemental content.

At 514, control circuitry 402 determines whether an indication that streaming of the supplemental content to the client device has ended has been received. For example, the supplemental content may have ended. Alternatively, an input may be received from the client device corresponding to a command to skip a portion of the supplemental content. If no indication has been received ("No" at 514), then control circuitry 402 continues, at 512, to stream the supplemental content. If an indication has been received ("Yes" at 514), then, at 516, control circuitry 402 resumes streaming of the video game cutscene to the client device.

The actions or descriptions of FIG. 5 may be used with any other embodiment of this disclosure. In addition, the actions and descriptions described in related to FIG. 5 may be done in suitable alternative orders or in parallel to further the purposes of this disclosure.

Figure 6:
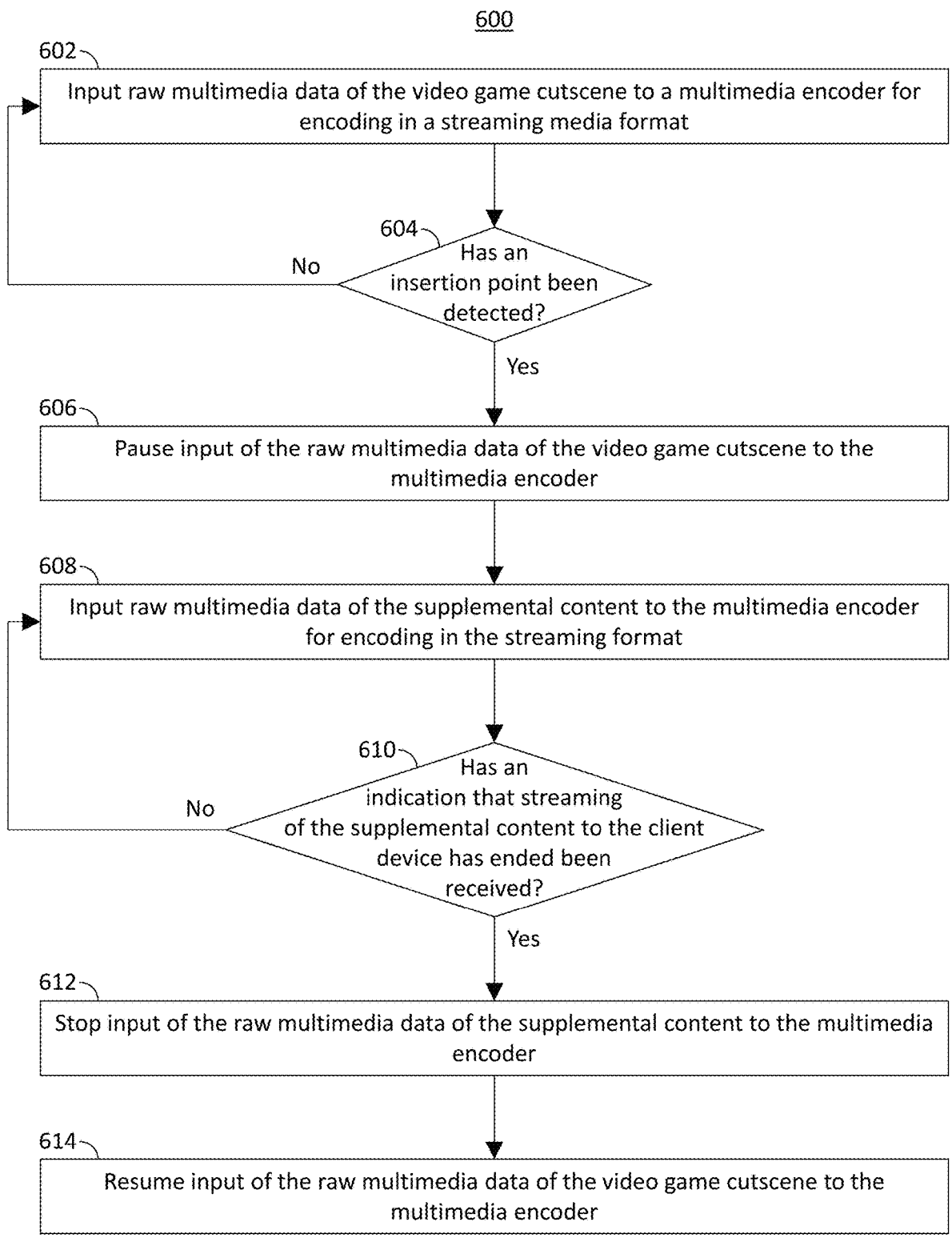
FIG. 6 is a flowchart representing a process for generating a single output stream from a streaming media encoder, in accordance with some embodiments of the disclosure.

FIG. 6 is a flowchart representing an illustrative process 600 for generating a single output stream from a streaming media encoder. Process 600 may be implemented on control circuitry 402. In addition, one or more actions of process 600 may be incorporated into or combined with one or more actions of any other process or embodiment described herein.

At 602, control circuitry 402 inputs raw multimedia data of the video game cutscene to a multimedia encoder for encoding in a streaming media format. This may be accomplished using any known streaming media encoding method with any known streaming media format. During the encoding process, as in FIG. 5, above, control circuitry 402 may monitor the video game cutscene data for a supplemental content insertion point. At 604, control circuitry 402 determines whether an insertion point has been detected. If not ("No" at 604), then control circuitry 402 continues, at 602, to input the raw multimedia data of the video game cutscene into the multimedia encoder.

If an insertion point has been detected ("Yes" at 604), then, at 606, control circuitry 402 pauses input of the raw multimedia data of the video game cutscene to the multimedia encoder and, at 608, inputs raw multimedia data of the supplemental content to the multimedia encoder for encoding in the streaming format. As in FIG. 5, above, control circuitry 402 may determine, at 610, whether at indication that streaming of the supplemental content to the client device has ended has been received. If not ("No" at 610), then control circuitry 402 continues, at 608, to input the raw multimedia data of the supplemental content to the multimedia encoder. If an indication has been received ("Yes" at 610), then, at 612, control circuitry 402 stops input of the raw multimedia data of the supplemental content to the multimedia encoder and, at 614, resumes input of the raw multimedia data of the video game cutscene to the multimedia encoder.

The actions or descriptions of FIG. 6 may be used with any other embodiment of this disclosure. In addition, the actions and descriptions described in related to FIG. 6 may be done in suitable alternative orders or in parallel to further the purposes of this disclosure.

Figure 7:
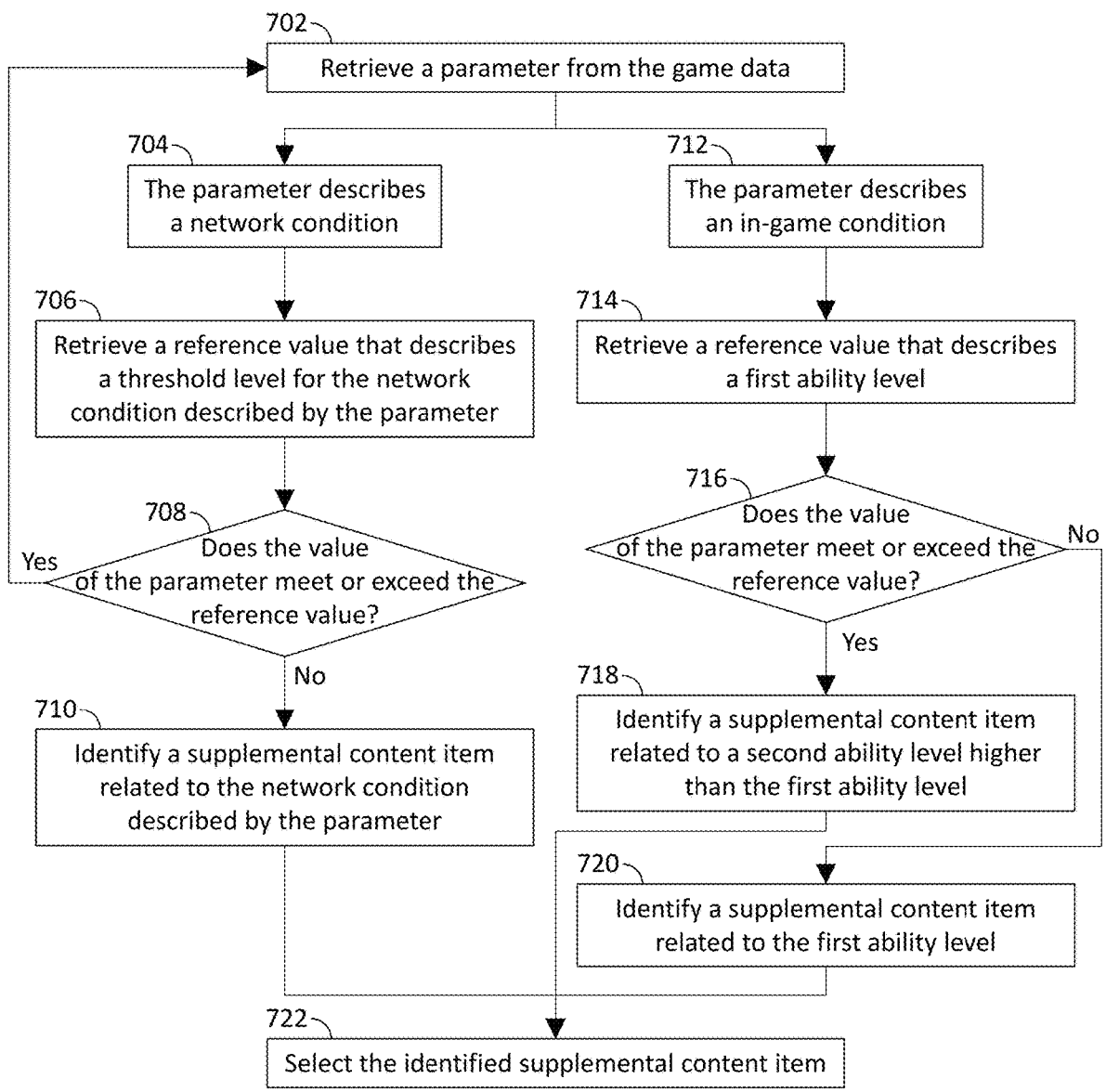
FIG. 7 is a flowchart representing a process for identifying and selecting a supplemental content item for insertion into a video game cutscene, in accordance with some embodiments of the disclosure.

FIG. 7 is a flowchart representing an illustrative process 700 for identifying and selecting a supplemental content item for insertion into a video game cutscene. Process 700 may be implemented on control circuitry 402. In addition, one or more actions of process 700 may be incorporated into or combined with one or more actions of any other process or embodiment described herein.

At 702, control circuitry 402 retrieves a parameter from game data. The parameter may describe an in-game condition or a network condition. If the parameter describes a network condition, such as connection speed, data transmission rates, types of networks, etc., then processing proceeds with the branch beginning at 704. At 706, control circuitry 402 retrieves a reference value that describes a threshold level for the network condition described by the parameter. For example, if parameter describes the data transmission rate of the connection with the client device, control circuitry 402 may retrieve a reference value for data transmission rates. The parameter may have a value of 30 Mbps while the reference value may be 50 Mbps. At 708, control circuitry 402 determines whether the value of the parameter meets or exceeds the reference value. If so, then there is no need to present supplemental content (e.g., an advertisement) relating to data transmission rates, and processing returns to 702. If the value of the parameter does not meet or exceed the reference value ("No" at 708), then, at 710, control circuitry 402 identifies a supplemental content item related to the network condition described by the parameter. For example, if the parameter describes data transmission rates, control circuitry 402 may identify as the supplemental content item an advertisement from an internet service provider or mobile network operator for faster internet connections.

If the parameter describes an in-game condition, such as character statistics, experience levels, etc., then processing proceeds with the branch beginning at 712. At 714, control circuitry 402 retrieves a reference value that describes a first in-game ability level. For example, the reference value may be a number of experience points (XP) needed to reach the first ability level. At 716, control circuitry 402 determines whether the value of the parameter meets or exceeds the reference value. For example, control circuitry 402 compares the user's XP to the XP required to reach the first ability level. If the value of the parameter meets or exceeds the reference value ("Yes" at 716), then, at 718, control circuitry 402 identifies a supplemental content item related to a second ability level higher than the first ability level. If the value of the parameter does not meet or exceed the reference value ("No" at 716), then, at 720, control circuitry 402 identifies a supplemental content item related to the first ability level.

After identifying, at 710, a supplemental content item related to the network condition, or, at 718, a supplemental content item related to a second ability level, or, at 720, a supplemental content item related to the first ability level, at 722, control circuitry selects the identified supplemental content item. Control circuitry 402 may transmit a request to a supplemental content source for the identified supplemental content item. In some embodiments, control circuitry 402 identifies a type or class of supplemental content items, or one or more keywords for supplemental content items. This data is then used to query the supplemental content source.

The actions or descriptions of FIG. 7 may be used with any other embodiment of this disclosure. In addition, the actions and descriptions described in related to FIG. 7 may be done in suitable alternative orders or in parallel to further the purposes of this disclosure.

Figure 8:
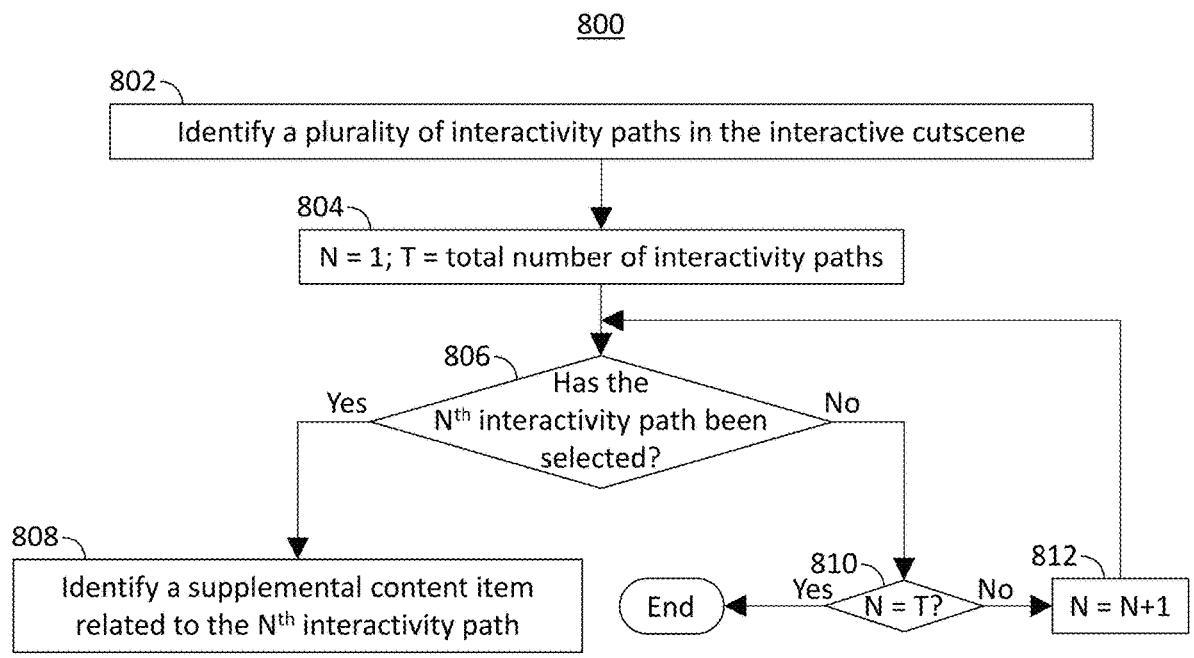
FIG. 8 is a flowchart representing a process for identifying a supplemental content item for insertion into a cloud-rendered interactive video game cutscene, in accordance with some embodiments of the disclosure.

FIG. 8 is a flowchart representing an illustrative process 800 for identifying a supplemental content item for insertion into a cloud-rendered interactive video game cutscene. Process 800 may be implemented on control circuitry 402. In addition, one or more actions of process 800 may be incorporated into or combined with one or more actions of any other process or embodiment described herein.

At 802, control circuitry 402 identifies a plurality of interactivity paths in the interactive cutscene. For example, metadata describing the entire cutscene may include a counter or other data indicating the number of interactivity paths in the cutscene. At 804, control circuitry 402 initializes a counter variable N, setting its value to one, and a variable T, representing the total number of interactivity paths in the cutscene.

At 806, control circuitry 402 determines whether the $N^{th}$ interactivity path has been selected. For example, when an interactivity path has been selected, control circuitry 402 may record a path ID or other unique identifier of the selected path. Alternatively, control circuitry 402 may identify the selected path based on metadata of frames of the cutscene currently being encoded for streaming. If the $N^{th}$ interactivity path has been selected ("Yes" at 806), then, at 808, control circuitry 402 identifies a supplemental content item related to the $N^{th}$ interactivity path. For example, if the $N^{th}$ interactivity path takes the setting of the cutscene to a weapons depot, control circuitry 402 may identify a supplemental content item relating to an in-game offer for a special weapon.

If the $N^{th}$ interactivity path has not been selected ("No" at 806), then, at 810, control circuitry 402 determines whether N is equal to T, meaning that all the interactivity paths have been checked. If N is not equal to T ("No" at 810), then, at 812, control circuitry 402 increments the value of N by one and processing returns to 806. If N is equal to T ("Yes" at 810), then all interactivity paths have been checked and the process ends.

The actions or descriptions of FIG. 8 may be used with any other embodiment of this disclosure. In addition, the actions and descriptions described in related to FIG. 8 may be done in suitable alternative orders or in parallel to further the purposes of this disclosure.

The processes described above are intended to be illustrative and not limiting. One skilled in the art would appreciate that any of the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for inserting supplemental content into a cloud-rendered video game cutscene, the method comprising:
    identifying a video game cutscene for streaming to a client device;
    retrieving game data related to a game session associated with the client device;
    identifying, based on the game data, a supplemental content item for insertion into the video game cutscene, wherein the supplemental content item is associated with the game session; and
    after determining an insertion point in the video game cutscene:
        streaming the supplemental content item to the client device in place of at least a first portion of the video game cutscene; and
        after determining the streaming of the supplemental content item to the client device has ended, streaming at least a second portion of the video game cutscene to the client device.

2. The method of claim 1, further comprising streaming, to the client device, the video game cutscene, wherein:
    streaming the supplemental content item to the client device in place of the at least a first portion of the video game cutscene comprises pausing streaming of the video game cutscene and initiating streaming of the supplemental content item.

3. The method of claim 1, further comprising determining the streaming of the supplemental content item to the client device has ended by at least one of (i) determining the streaming has reached an end of the supplemental content or (ii) receiving an input corresponding to a command to skip a portion of the supplemental content.

4. The method of claim 1, the supplemental content item is identified based on a comparison of a parameter from the game data to a reference value.

5. The method of claim 1, further comprising streaming a third portion of the video game cutscene to the client device, wherein:
the insertion point coincides with an end of the third portion of the video game cutscene.

6. The method of claim 1, wherein:
the video game cutscene is an interactive cutscene; and
the insertion point is detected in a selected interactivity path of the interactive cutscene.

7. The method of claim 1, wherein the supplemental content is an advertisement.

8. The method of claim 2, wherein streaming the at least a second portion of the video game cutscene to the client device comprises resuming streaming of the video game cutscene.

9. The method of claim 4, wherein the parameter describes a network condition.

10. The method of claim 4, wherein the parameter describes an in-game condition.

11. A method for inserting supplemental content into a cloud-rendered video game cutscene, the method comprising:
identifying a video game cutscene for streaming to a client device;
retrieving game data related to a game session associated with the client device;
identifying, based on the game data, a supplemental content item for insertion into the video game cutscene, wherein the supplemental content item is associated with the game session;
streaming, to the client device, at least a first portion of the video game cutscene; and
after determining an insertion point in the video game cutscene, streaming the supplemental content item to the client device in place of at least a second portion of the video game cutscene.

12. The method of claim 11, wherein streaming the supplemental content item to the client device in place of the at least a second portion of the video game cutscene comprises pausing streaming of the video game cutscene and initiating streaming of the supplemental content item.

13. The method of claim 11, further comprising after determining the streaming of the supplemental content item to the client device has ended, streaming at least a third portion of the video game cutscene to the client device.

14. The method of claim 11, the supplemental content item is identified based on a comparison of a parameter from the game data to a reference value.

15. The method of claim 11, wherein:
the video game cutscene is an interactive cutscene; and
the insertion point is detected in a selected interactivity path of the interactive cutscene.

16. The method of claim 11, wherein the supplemental content is an advertisement.

17. The method of claim 13, wherein streaming the at least a third portion of the video game cutscene to the client device comprises resuming streaming of the video game cutscene.

18. The method of claim 13, further comprising determining the streaming of the supplemental content item to the client device has ended by at least one of (i) determining the streaming has reached an end of the supplemental content or (ii) receiving an input corresponding to a command to skip a portion of the supplemental content.

19. The method of claim 14, wherein the parameter describes at least one of a network condition or an in-game condition.

20. A system, comprising:
memory; and
control circuitry configured to:
identify a video game cutscene for streaming to a client device;
retrieve, from the memory, game data related to a game session associated with the client device;
identify, based on the game data, a supplemental content item for insertion into the video game cutscene, wherein the supplemental content item is associated with the game session; and
after determining an insertion point in the video game cutscene:
stream the supplemental content item to the client device in place of at least a first portion of the video game cutscene; and
after determining the streaming of the supplemental content item to the client device has ended, stream at least a second portion of the video game cutscene to the client device.

* * * * *